Feb. 13, 1962     R. LINDENFELSER ET AL     3,021,239
STRUCTURES COMPRISING A MODIFIED
DIAMINOTRIAZINE-ALDEHYDE
RESINOUS COMPOSITION
Filed April 9, 1957

PRINT SHEET IMPREGNATED WITH A THERMOSET
COMPOSITION COMPRISING AN ALKYD RESIN—
MODIFIED 2-ARYL-4,6-DIAMINO-1,3,5-TRIAZINE-
ALDEHYDE RESIN

Fig. 1.

BASE, E.G., A LAMINATED CORE, ASBESTOS
CEMENT BOARD, ETC., HAVING A THICKNESS
OF AT LEAST 1/16 INCH

CLEAR, THERMOSET RESIN LAYER COMPRISING
AN ALKYD RESIN—MODIFIED 2-ARYL-4,6-DIAMINO-
1,3,5-TRIAZINE-ALDEHYDE RESIN

PRINT SHEET
IMPREGNATED WITH
A RESIN, E.G., A
THERMOSET MELAMINE-
FORMALDEHYDE RESIN

BASE, SPECIFICALLY A LAMINATED CORE,
HAVING A THICKNESS OF AT LEAST 1/16 INCH

Fig. 2.

TRANSPARENT, RESIN—IMPREGNATED OVERLAY SHEET,
E.G., PLAIN PAPER IMPREGNATED WITH A THERMOSET
COMPOSITION COMPRISING, E.G., ALKYD RESIN—MODIFIED
2-ARYL-4,6-DIAMINO-1,3,5-TRIAZINE-ALDEHYDE
RESIN

PRINT SHEET
IMPREGNATED
AS DESCRIBED IN
FIG. 1

BASE, E.G., A LAMINATED CORE,
ASBESTOS CEMENT BOARD, ETC.,
HAVING A THICKNESS OF AT LEAST 1/16 INCH

Fig. 3.

INVENTORS.
RICHARD LINDENFELSER
MARTHA K. LAYMAN
(nee MARTHA K. KILTHAU)
BY
Harold L. Kauffman
ATTORNEY.

United States Patent Office 3,021,239
Patented Feb. 13, 1962

3,021,239
STRUCTURES COMPRISING A MODIFIED DIAMINOTRIAZINE-ALDEHYDE RESINOUS COMPOSITION
Richard Lindenfelser, Darien, and Martha K. Layman, nee Martha K. Kilthau, Stamford, Conn., assignors to American Cyanamid Company, New York, N.Y., a corporation of Maine
Filed Apr. 9, 1957, Ser. No. 651,629
13 Claims. (Cl. 154—45.9)

This invention relates broadly to articles of manufacture or structures comprising a modified diaminotriazine-aldehyde resinous composition. More particularly the invention relates to decorative structures of various kinds that include a resin-impregnated print sheet having a craze-resistant surface. This surface comprises a cured resinous material which, in uncured state, is a curable resinous composition comprising a compatible blend of (1) an uncured resinous product of reaction of ingredients consisting essentially of an aldehyde, e.g., formaldehyde, and a 2-aryl-4,6-diamino-1,3,5-triazine, e.g., benzoguanamine, and (2) from about 10% to about 50%, preferably from about 20% to about 40%, based on the total weight of (1) and (2), of an alkyd resin which is compatible with the resinous product of (1).

In the article and method features of this invention the aforesaid print sheet is directly bonded to a base member having a thickness of at least 1/16 inch, e.g., from 1/8 to about 1 inch, or in some cases as much as 2 inches, this thickness being correlated with the density of the said base member whereby the latter is adapted to retain its normal form under moderate stress. The minimum thickness of the base member, correlated with the density thereof as has just been described, is critical in carrying the present invention into effect. The maximum thickness of the base member is governed by practical considerations, e.g., availability, cost, where and how the article is to be used, etc.

Decorative structures, to the production of which the present invention is particularly directed, include laminated articles which are useful in horizontal applications (or so-called "working surfaces") and those which can be employed in vertical applications, e.g., wall paneling and the like.

The conventional high-pressure laminates, which heretofore have been used in horizontal surface applications such as table tops, restaurant counter tops, bar tops, etc., are usually composed of a laminated core, a print sheet and an overlay sheet. In such laminated articles the core is conventionally built up of a number of plies of paper, specifically kraft paper, which has been impregnated with a phenolic resin, assembled and consolidated under heat and pressure. The function of the core is to impart rigidity to the structure, using a minimum amount of core material, and to do this at the lowest possible cost. These objectives are generally attained by using a low-cost kraft paper, a low-cost phenolic resin and the lowest possible amount of phenolic resin as an impregnant for the kraft paper. The print sheet supplies the decorative effect to the laminate and, in preparing the assembly for lamination, is placed on top of the sheets constituting the core. The print sheet is generally composed of pure alpha-cellulose paper, absorbent regenerated cellulose paper, etc., on which either has been printed a design or which has been dyed or pigmented to give a solid color to the paper. The printed designs have unlimited range of form or artistic effect so long as the inks that are used are non-bleeding in the resin solution. The print sheet also is treated with a resin, generally heretofore with a melamine-formaldehyde resin. Insofar as the print sheet is concerned, the most important properties are good appearance and durability. Such properties can be obtained by the use of a melamine-formaldehyde resin, which is capable of imparting hardness, abrasion-resistance, solvent-resistance, and color-stability to the print sheet.

Because of the excessive wear to which horizontal surfaces are generally subjected, it has been the general practice heretofore to impart greater durability to the aforedescribed laminate by applying an overlay sheet over the print sheet. The overlay sheet usually consists of a single sheet of paper, generally alpha-cellulose paper, treated with a melamine-formaldehyde resin. The primary objectives in the use of the overlay sheet are to impart durability to the print sheet without detracting from its appearance. The melamine resins have been widely used as impregnants for the overlay sheet because of their aforementioned desirable properties and, when thus employed, are present therein in a very substantial amount. The resin content of the overlay sheet is customarily about 60% to 70% of the weight of the treated sheet as compared with a conventional resin content of about 50% in the print sheet and a resin content of about 33% to 35% in the core sheets. Although the overlay sheet greatly increases the durability of the laminate, the cellulose contributes a small amount of haze and, as a result, it is necessary to use a relatively thin sheet of alpha-cellulose paper as the overlay sheet. (The overlay paper is customarily about 3 to 4½ or 5 mils in thickness as compared with a thickness of about 8 mils for the print sheet and thicknesses of about 8–12 mils for the individual core sheets.) The fiber of the paper also may adversely affect the resistance of the surface to staining.

Attempts were made prior to our invention to provide a surface consisting solely of resin on top of the print sheet, in an effort to obtain durability without loss of transparency. However, this has not been possible with conventional resins (e.g., melamine-formaldehyde resins) because such resins, without the reinforcing effect of cellulose fibers or their equivalent, craze on the surface of the laminated structure. It has previously been suggested that this crazing problem be solved by using a plasticized melamine-formaldehyde resin, but attempts along this line have not been entirely satisfactory.

Reference was made in the third paragraph of this specification to the fact that decorative structures include not only laminated articles which are useful in horizontal applications but also structures which can be employed in vertical applications such as wall paneling and the like. In vertical applications the surfaces do not require the same degree of abrasion resistance and surface resistance as is required in horizontal applications such as table tops. Because of this fact, an overlay sheet is not necessary in producing the laminated body. However, other requirements are imposed on the resin that is used to treat the print sheet, as will be apparent from the following discussion.

Vertical panels are frequently made by applying a resin-impregnated print sheet to a base material other than the laminated core structure described briefly above when discussing laminated articles commonly employed in horizontal applications. Base materials that are used in vertical panels or structures include Masonite wall board, asbestos cement board, wood waste board, plywood, etc., these relatively inexpensive materials being employed in order to keep costs at a minimum. Such base materials have a considerably lower density than laminated cores formed of, for example, kraft paper impregnated with a phenolic resin. As a result, they undergo considerably greater fluctuation of dimensions with changes in temperature and humidity than do the aforementioned laminated cores. Consequently the resin-impregnated print sheet (surface sheet bearing the decorative design) that is applied to such base materials is placed under considerable stress. Many resins, e.g., melamine-formaldehyde resins, are characterized by their high degree of inflexibility, and hence, in structures of the kind just described, print sheets containing such resins generally craze on aging and/or cause warping of the panel or structure. Attempts previously have been made to employ a print sheet containing a melamine-formaldehyde resin in vertical panels with the aid of several, intermediate, phenolic resin-treated core sheets which were assembled between the print sheet and the wall board or other base material. To the best of our knowledge and belief it was not possible prior to our invention to apply a single melamine resin-impregnated print sheet to any of the base materials just described without obtaining surface crazing and/or warping of the laminated article.

In the structures known in the art and wherein a melamine-resin laminate is used in combination with a core, the said laminate has to be made separately and is then bonded to the core; and, if the core is of inadequate thickness, the assembly must be balanced. Alternatively, a melamine resin-treated print sheet can be bonded to the core in one operation if several phenolic resin-treated sheets are interposed between the print sheet and the core and if the assembly is balanced. Structures produced in these ways are expensive and time-consuming to make.

The present invention provides a solution to the aforementioned problems heretofore encountered in constructing decorative vertical panels due, for one reason, to the fact that the resinous compositions used in practicing the present invention have, in cured state, considerably greater flexibility than cured melamine-formaldehyde resins. As a result, the practicing of our invention makes it possible to apply a single resin-impregnated print sheet to a structural board such as Masonite board, asbestos cement board and others of the kind aforementioned, thereby to obtain a decorative surface which is characterized by its excellent stability on aging, including resistance to crazing.

Our invention makes it possible to bond (as by the simultaneous application of heat and pressure) a resin-impregnated print sheet directly to a base member having the minimum thickness hereinbefore set forth, with a single balance sheet or no balance sheet (with overlay of, for example, 4 to 5 mils thick).

In general, the resin content of print sheets impregnated with resinous materials of the kind described briefly in the first paragraph of this specification is approximately 50% to 55% by weight of the treated print sheet. If desired, an overlay sheet containing the same or a different resinous composition, e.g., a melamine-formaldehyde resin, may be applied over the print sheet for those applications where it is desired to obtain even greater durability and especially extreme resistance to wear. However, the application of an overlay sheet is not necessary in order to prevent crazing or cracking of the surface.

In our Patent No. 2,732,325 dated January 24, 1956, we have disclosed and claimed resinous compositions suitable for use in overcoming the crazing problem heretofore encountered when an attempt was made to use an unfilled resin layer or coating on the print sheet, as well as structures comprising the resin. Such resinous compositions comprise a diaminotriazine resin of a particular class and which are plasticized with certain polyvinyl acetals or partially hydrolyzed polyvinyl acetates. Reference is made to this patent for additional information on the prior practices and problems encountered in making decorative laminates. The resinous compositions used in producing the structures of this invention have certain advantages over those disclosed and claimed in our aforementioned patent, e.g., lower cost, lower viscosity in solution for the same resin concentration, the need for less solvent in applying the resin solution, and the production of a smoother surfaced laminated article.

It is an object of the present invention to produce articles of manufacture, specifically decorative laminates, which include a print sheet having a craze-resistant surface.

Another object of the invention is to produce a heat- and pressure-consolidated laminate having a hard, craze-resistant surface.

A further object of the present invention is the production of clear, translucent or opaque surfaces on laminated articles.

It is a further object of the present invention to provide laminated articles with surfaces which are light-colored and light-stable, are resistant to heat, solvents and abrasion, and which also have a high gloss, good durability and a smooth surface.

Other objects of the invention will be apparent to those skilled in the art from the following more detailed description and from FIGS. 1, 2 and 3 of the accompanying drawing which are side elevations, partly broken, that illustrate articles or structures comprising preferrerd embodiments of the invention.

The foregoing and other objects are attained by the use (especially in making decorative laminates) of a curable (thermosetting) resinous composition comprising a compatible blend of an alkyd resin and an uncured resinous product of reaction of ingredients consisting essentially of (A) an aldehyde, preferably formaldehyde, and (B) a 2-aryl-4,6-diamino-1,3,5-triazine, that is, a diaminotriazine represented by the general formula where R represents an aryl radial. Examples of the 4,6-diaminotriazines of (B) are benzoguanamine, the o-, m- and p-toluguanamines, the o-, m- and p-xyloguanamines, the alpha- and beta-naphthoguanamines, etc.

The above reactants of (A) and (B) are reacted in particular proportions, under particular conditions and to a particular degree, in producing the uncured, but curable, resinous reaction products which are modified with an alkyd resin and used in practicing the present invention. More particularly, the aldehyde of (A) and the 4,6-diaminotriazine of (B) are employed in a molar ratio of about 1:1 to about 4:1 and are caused to react with each other at a temperature of from about 60° C. to about 200° C. The reaction can be effected over a wide pH range, e.g., under pH conditions ranging from about 4 to about 11, advantageously at a pH of from about 4 to about 9, and usually at a pH of from 6 to 8 or 9. The reaction is continued to the point where the resin solution is stable upon aging but not beyond the point where the resin becomes insoluble. These limits characterize those resins which are applied from solution state. In some cases it may be desirable to apply a powdered resin to the print sheet in which case the upper limit of reaction is extended beyond the point of solubility. More particularly the upper limit then becomes that point at which the resin still has adequate flow during the curing cycle so that it can be consolidated on the surface of the laminate thereby to obtain a clear, thermoset resin layer which is integral with the resin-impregnated print sheet.

By one method of determining the end point the reaction between the aldehyde and the 2-aryl-4,6-diaminotriazine is continued to the point where the resulting condensation product, when dissolved in ethyl alcohol to form a 50% solution, gives a composition which is stable (as evidenced by the absence of any precipitate formation) at 20°–25° C. for at least 5 hours; but the reaction is not allowed to proceed beyond the point where the condensation product has a plasticity or flow of about 60 mils as determined by the "Cyanamid test method" hereafter described.

A charge of fifty grams of the material at 20°–30° C. is placed in the center of the bottom platen of a molding press, both platens of which are at a temperature of 290°±2° F. and which are so shaped and grooved as to produce a flat molded disc with concentric ridges the first of which is 1½ inches from the center of the disc, and which are spaced ½ inch apart, and each of which is $\frac{1}{32}$ inch high, $\frac{1}{16}$ inch wide at the top and with the sides sloping inwardly toward the top at an angle of 30° from the perpendicular. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity.

By another, more specific and preferred method of determining the end point (so-called "blue tail" test), the reaction between the aldehyde, specifically formaldehyde, and the aryl diaminotriazine, specifically benzoguanamine, is continued until a small amount of a finely ground sample of the solid resin, that is, in solid state (obtained by cooling a sample of the hot syrup), produces a definite blue haze at 25° C. in about 10–15 ml. of a 50–50 mixture, by weight, of ethanol and water. In making this test a few particles of the finely ground resin are dropped into a test tube containing about 10–15 ml. of the aforesaid ethanol-water mixture at 25° C. As the particles of resin settle to the bottom of the solution, a blue tail can be detected if the resin has reached the desired end point. (The blue tail should not be confused with "schlieren" lines resulting from the change of refractive index due to the solution of the resin in the alcohol.)

The above-described 4,6-diaminotriazine-aldehyde condensation product is blended in the proportions hereinbefore mentioned with an alkyd resin (advantageously an oil-modified alkyd resin) which is compatible therewith in order to produce the curable resinous compositions employed in making the structural articles of the present invention.

The resulting homogeneous blend or solvent solutions thereof are particularly suitable for use in producing clear, unfilled surfaces on decorative laminates. In the cured state they have good color and clarity and provide a surface which is resistant to wear, crazing, light, heat and staining.

The blend of resins may be cut with a variety of solvents or diluents such, for example, as ethanol, isopropanol, butanol, esters, ketones, etc., or with mixtures of an alcohol and an aromatic hydrocarbon, or of a ketone and an aromatic hydrocarbon, for instance a mixture of 40% ethanol and 60% toluene by volume. The resin solutions may be applied to the material to be treated either by knife or roll coating. Prior to use a catalyst, e.g., phthalic anhydride, para-toluenesulfonic acid or other curing catalyst, advantageously is added to the blend or solution thereof so as to catalyze the cure of the resin. The catalyst advantageously may be added while the resins are being dissolved in the solvent. The amount of catalyst may be varied as desired or as conditions may require but ordinarily is within the range of from about 0.1% to 1% or 2%, or in some cases even as much as 3% or 4%, based on the amount of resin solids in the solution. The minimum amount of catalyst required to give the desired cure rate should be employed, and this is generally a matter of considerable importance where good electrical properties are wanted in the finished structure. Of course, the use of higher percentages of catalyst than that which has been specified hereinbefore is not precluded.

Although resinous compositions comprising a blend of an alkyd resin and a reaction product of formaldehyde and formoguanamine or benzoguanamine were known prior to our invention (see, for example, Moore U.S. Patent No. 2,218,474), such resinous compositions are not the equivalent of resinous compositions herein involved and cannot be used for those applications for which the resinous materials of this invention are especially designed. It is believed that this fact will be clear from the following brief discussion.

Many aminotriazines and, in particular, melamine when reacted with an aldehyde, specifically formaldehyde, in the absence of an alcohol form resinous compositions which, in blends with an alkyd resin, do not provide a completely transparent surface when applied to a surface sheet material, specifically a print sheet, to form a decorative laminate. The compatibility of aminotriazine-aldehyde resins with alkyd resins may be improved by etherification of the methylol aminotriazine (the methylol derivative being obtained when the aldehye is formaldehyde), as by reaction of the initial aminotriazine-aldehyde reaction product with an alcohol, e.g., butanol. Etherified aminotriazine-formaldehyde resins are not the equivalent of the resinous compositions of the present invention and are entirely unsuitable for producing the decorative laminates for which the resinous materials of this invention are particularly suited. When compositions comprised or composed essentially of etherified (alcohol-reacted) aminotriazine-formaldehyde resins are cured under heat and pressure, the large amount of volatile material that is present therein, and which is liberated during curing of the resin, causes excessive gassing and results in a poor surface finish. These surfaces are not as hard and durable as is required during normal service use of the decorative laminate, and generally craze and crack; furthermore, they frequently have very poor solvent resistance. In marked contrast, the resinous compositions herein involved provide smoothly surfaced laminated articles which have excellent craze, heat and solvent resistance.

Examples have been given hereinbefore of 2-aryl-4,6-diamino-1,3,5-triazines which are used as a reactant with an aldehyde to form condensation products that are then blended with an alkyd resin to form curable resinous compositions for use in producing the structural articles of this invention. Of such diaminotriazines we prefer to use benzoguanamine alone or admixed with other 2-aryl-4,6-diamino-1,3,5-triazines. Mixtures of two, three or any other number of such diaminotriazines may be used in place of a single such triazine if desired.

By using a 2-aryl-4,6-diamino-1,3,5-triazine as a reactant with an aldehyde, specifically formaldehyde, better solubility and compatibility characteristics are imparted, because of the aryl grouping attached directly to the triazine nucleous of the diaminotriazine, to the aldehyde-condensation products as compared with those of, for example, a condensation product of melamine and an aldehyde, specifically formaldehyde, which has been reacted under comparable conditions. These improvements in solubility in conventional solvents and in compatibility with other materials are obtained with the 2-aryl-4,6-diamino-1,3,5-triazines without detracting from the curing characteristics of the heat-curable aldehyde-reaction prodducts, or of blends thereof with a compatible alkyd resin in the proportions herein set forth. Additionally, the resin blends used in practicing our invention yield hard, cured, transparent (if desired) craze-resistant surfaces. That the individual components of the blend would coact to produce such results was quite surprising and unexpected, and in no way could have been predicted from their known properties.

While we prefer the use of formaldehyde either in aqueous solution or as paraformaldehyde for condensation with the above- indicated aminotriazines, other aldehydes or substances yielding an aldehyde, e.g., acetaldehyde, propionaldehyde, valeraldehyde, furfural, trioxane, paraldehyde, benzaldehyde, etc., may be employed. The combined molar ratios of aldehyde to aminotriazine will vary from about 1:1 to about 4:1, the preferred range being from about 1.5:1 to about 2.5:1. To obtain light-colored products, aldehydes should be used that impart little or no color to the product, e.g., formaldehyde.

The temperature of the reaction mass during the resin-forming condensation reaction should be sufficiently high to ensure dissolution of the initial reaction product in the solvent employed. This minimum temperature is about 60° C. The practical upper limit of the reaction temperature is the reflux temperature of the mass when the reaction is carried out at atmospheric pressure. If higher pressures are used, the temperature may be increased, but it should not be above about 200° C. The preferred temperature range is generally from about 80° C. to about 105° C.

The reaction is caused to proceed to the desired end point under the pH conditions described previously herein. A buffer may be used in order to maintain the reaction mass in the preferred pH range and for this purpose we may use, for example, sodium hydroxide, potassium hydroxide, ammonium hydroxide, sodium carbonate, sodium bicarbonate, potassium bicarbonate or other inorganic base; also organic bases, more particularly organic amines, e.g., diethylaminoethanol, triethanolamine and the like. In general, we prefer to adjust the pH of the reaction mass with sodium hydroxide.

The actual reaction time for the resin-forming condensation reaction will, of course, be dependent on various factors such as solids concentration, pH, temperature and the like, but it is generally held to from about 10 minutes to about 1 hour.

The condensation reaction may be carried out in the absence of a solvent or diluent or, if desired, in the presence of such solvents or diluents as water or organic solvents including ketones, aldehydes, alcohols, hydrocarbons, esters, ethers, dioxane, etc., which are inert to, or do not form undesirable reaction products with, the resin-forming ingredients and the resin formed. Mixtures of any number of the organic-type solvents or diluents may also be used. We prefer to operate in the presence of water and to avoid the use of alcohols or other hydroxyl-containing solvents or diluents.

Upon completion of the condensation reaction the resin, which will generally be in the form of an aqueous slurry, can be dehydrated, for example, by a spray-drying operation, by kettle dehydration, with or without vacuum, or by drum-drying. If either of the two latter expedients is employed, the resulting friable solid is ground or pulverized. Kettle dehydration is preferred when a solution of the resin is described, in which case the solvent is added to the molten resin. The alkyd resin then may be added or, if desired, it may be added later.

In order to prevent over-polymerization of the resin during the drying step, its pH should not be too low. It may not be necessary to adjust the pH if the condensation reaction was carried out at a pH above about 7, more particularly at a pH of from about 7 to about 11, but if the reaction was carried out in the pH range of from about 4 to less than about 7, it may be desirable to increase the pH to about 7 to 8.5 during drying.

In practicing our invention all of the triazine and aldehyde to be employed may be reacted initially or, if desired, a portion of the aldehyde may be reacted initially with the triazine and the remaining added during a later stage of the process. If desired, the reaction may be carried out in the presence of the alkyd resin. The alkyd resin may be present from the beginning in the first stage, or it may be added to the aminotriazine resin during or after dehydration of the latter.

In the preparation of the compositions herein involved, the alkyd resin utilized may be one which is oil-free or it may be what is commonly referred to as a short oil-modified alkyd resin, namely, one containing less than 25% oil based on the total weight of the alkyd resin; or a medium-oil alkyd which is defined as an alkyd resin that has been modified with from 25% to less than 50% of oil; or a long-oil alkyd which is generally defined as an alkyd resin that has been modified with from 50% to not more than 80% of oil. The alkyd resins employed as a modifier of the diaminotriazine resin are those which are conventionally prepared by use of a polycarboxylic acid and a polyhydric alcohol in which the acid may be a saturated acid or an alpha-unsaturated acid, more particularly an alpha, beta-unsaturated acid, but preferably those which are saturated.

In the preparation of the alkyd resin, one may modify the resin by use of oils or oil acids of the drying, semi-drying or non-drying classes although it is preferred that the semi-drying or non-drying oils be used. There is little overall advantage to be derived from using exclusively the drying oils although they may be employed where, for example, color retention on baking is not as important as adhesion. If the amount of oil used to modify the alkyd resin be decreased, particularly when the range of proportion comes within the limits of those set forth above and defined as short-oil alkyd resins, the necessity for the use of a more polar solvent for the resin becomes more pronounced.

Saturated or unsaturated polycarboxylic acids may be used in making the alkyd resin. Amongst those saturated polycarboxylic acids which may be employed are malonic, succinic, glutaric, sebacic, adipic, pimelic, suberic, azelaic, tricarballylic, citric, tartaric and malic. Phthalic acid and terephthalic acid may also be used in the preparation of the alkyd resins in the same proportions as the saturated polycarboxylic acids. Additionally, one may use such unsaturated acids as maleic, fumaric, itaconic, mesaconic, citraconic and the like. These acids and other comparable acids, their esters and their available anhydrides may be used in the preparation of these alkyd resins. Obviously, these acids may be used either singly or in combination with one another.

In making the alkyd resin, the conventional polyhydric alcohols may be used, e.g., ethylene glycol, diethylene glycol, dipropylene glycol, tetramethylene glycol, pinacol, trimethylol propane, trimethylol ethane, mannitol, dulcitol, sorbitol, glycerol, pentaerythritol, dipentaerythritol and the like. The polyhydric alcohols may be used either singly or in combination with one another in the esterification reaction in the preparation of the alkyd resin.

In the esterification reaction between the polycarboxylic acid and the polyhydric alcohol in the formation of the alkyd resin, it is possible to use a polyhydric alcohol in equimolecular proportions with a polycarboxylic acid. There are instances, however, in which it is desired to use as much as 50% in excess of the amount of polyhydric alcohol of that theoretically required to esterify completely the polycarboxylic acid. The excess of alcohol in the reaction mixture is desirable in order to produce, in a reasonably short time, an esterification product of relatively low acid number.

In the preparation of the oil-modified alkyds, one may use such oils as castor oil, linseed oil, chaulmoogra oil, cherry kernel oil, corn oil, hemp seed oil, grape seed oil, hazel nut oil, candlenut oil, lard oil, soya bean oil, coconut oil, cottonseed oil, olive oil, peach kernel oil, peanut oil, pistachio nut oil, rape seed oil, and the like.

The compositions herein involved comprise compatible or substantially homogeneous mixtures of 4,6-diaminotriazine-aldehyde condensation products of the kind described hereinbefore and an alkyd resin, preferably an oil-modified alkyd resin, also of the kind previously described. Mixtures of different diaminotriazine resins may be used in conjunction with one or more different alkyd resins; or, if desired, a single diaminotriazine-aldehyde resin may be employed with a plurality of different alkyd resins.

The resinous compositions with which this invention is concerned may be modified by incorporating therein a wide variety of dyes, pigments, fillers and other effect agents. By varying the pigments and dyes it is possible to produce colored materials of many different kinds.

Thus, depending upon the effect desired, up to 50% or more of such pigments and dyes as ochre, carbon black, malachite green, Prussian blue, ultramarine, zinc oxide, ferric oxide, zinc sulfide, titanium dioxide, pearlescent material and the like may be added to the resinous composition. In addition to pigments and dyes, which of course also act as fillers, luminous or fluorescent materials as well as cellulosic, glass, asbestos and other fibers may be used for filling purposes.

The compositions comprising the described aminotriazine resin and alkyd resin may be formulated in the absence of a solvent or in the presence of an organic solvent or diluent, including alcohols, ketones, esters, hydrocarbons and the like. We prefer formulation in the presence of a non-toxic, low-boiling organic solvent or solvent mixture of a polar nature such as, for example, an alcohol-aromatic hydrocarbon mixture or a ketone-aromatic hydrocarbon mixture, e.g., a mixture of methyl ethyl ketone and toluene.

The coating compositions may be applied by any desired method, such as dip-coating, knife-coating, spray-coating, dry spread or roll-coating, to the base to be coated. In the case of surfacings on laminated articles it may be applied to resin-impregnated sheets which are dried and placed on a foundation body to become the outside plies of the laminate.

The resinous compositions used in producing the structural articles of the present invention advantageously are cured at a pH of from about 3.0 to 6.0 and, accordingly, it is often necessary to add a curing catalyst, which is usually an acidic or potentially acidic catalyst. This may be an organic acid such, for example, as benzoic acid, salicyclic acid, phthalic acid and the like, or it may be a mineral acid such, for instance, as hydrochloric acid. Again, as in the preparation of the triazine resin itself, it may not be necessary to add any additional acid to the composition if the resin was dried or finished off at a sufficiently low pH. Time of cure will vary with the temperature and with the particular triazine resin used.

In examples which follow and elsewhere herein, the term "structural board" as used generically means any rigid article of a cellulosic or mineral nature that is suitable for use in building construction, furniture, and the like. The term is represented by, but not limited to, the following specific types:

(1) Wallboard is the general category of cellulosic fibrous products that includes hardboard, insulating board, and sheathing board. (Reference: "Hardboard: Process, Properties, Potentials," U.S. Department of Agriculture Forest Service, Madison, Wis., No. D1928, September 1952.)

Insulating board is a porous, relatively low density (16 lbs./cu. ft.) material that is generally commercially available in thicknesses of ½ to 1 inch.

Sheathing board, also known simply as wallboard, has a density of about 45 lbs./cu. ft. and is commonly finished in thicknesses of 3/16 to 3/8 inch.

Hardboard is tougher than insulating or sheathing boards and has a relatively harder surface and a higher density (up to about 75 lbs./cu. ft.). Hardboard is manufactured by 3 methods: wet process, semi-dry process, and dry process, as described in the Dept. of Agriculture reference above. It is generally available in thicknesses of 1/16 to ¼ inch. The hardboard surfaced in Example 1 was made by the "wet" process, which preserves to some extent the fiber length of the wood and utilizes the natural lignin. The "dry" process makes use of granulated wood bonded with a binder such as phenolic resin and pressed into a board known as particle board. These materials, of which the so-called woodwaste board of Example 4 is representative, are of somewhat lower density (30 to 40 lbs./cu. ft.).

(2) Plywood is defined as "a cross banded assembly made of layers of veneer, or veneer in combination with lumber core or plies joined with an adhesive. Two types of plywood are recognized, namely veneer plywood and lumber core plywood." (Reference: "Hardwood Plywood," Commercial Standard CS 35–49, U.S. Department of Commerce.) The thickness and density of veneered plywood depend necessarily upon the thickness of the veneers and the number of plies, which, in turn, are determined by the type of wood and the nature of the application. Generally, veneered plywood consists of from 3 to 9 plies and the thickness varies from 3/16 to ½ inch. The density is 60 lbs./cu. ft. or less. Lumber core plywood is commonly manufactured in thicknesses of ½ to 2 inches, with a density equal to that of the wood itself, viz., 60 lbs./cu. ft. or less.

(3) Mineral base boards, such as asbestos or cement boards, sheet rock, plaster boards, and the like, are distinguished by their relatively high density (up to 125 lbs./cu. ft.). Thicknesses of ¼ to ½ inch are commonly available.

Any of the foregoing can comprise the base member or core of the structural articles of the present invention.

The structural articles, e.g., decorative laminates, of this invention, and which are characterized by their hard, craze-resistant surfaces, are suitable for use in the manufacture of, or they can be shaped or formed into, for example, table tops, sinks, dishes, trays, refrigerator panels, luggage, bathroom and kitchen furniture or, in fact, any application which demands a hard, craze-resistant, durable, light-colored and light-stable surface finish.

In order that those skilled in the art may better understand how the present invention can be carried into effect, the following examples are given by way of illustration and not by way of limitation. All parts and percentages are by weight unless otherwise stated.

EXAMPLE 1

A benzoguanamine-formaldehyde resin is prepared as follows:

| | Parts | Approx. Molar Ratio |
|---|---|---|
| Benzoguanamine | 644 | 1 |
| Aqueous formaldehyde (approx. 37% HCHO) | 558 | 2 |
| Aqueous sodium hydroxide (5 N) | 0.1 | |

The benzoguanamine and formaldehyde are charged to a suitable reaction vessel equipped with means for reflux. The slurry pH is 6.4. The reaction mixture is heated to reflux in 30 minutes and held at reflux, 94° C., for 60 minutes. The pH at reflux is 7.7. After 60 minutes, the solution becomes turbid and hydrophobic. The sodium hydroxide is then added to adjust the pH of the mixture to 9.3, and the temperature is lowered to 70° C. The reaction mass is then vacuum-concentrated at 23 cm. Hg pressure until the batch temperature reaches 120° C. where it is held for 10 minutes. The resin is poured onto trays and cooled to obtain a clear, dry, brittle resin which is ground to between about 60 mesh and 200 mesh fineness. The resin is infinitely dilutable in benzene-denatured anhydrous ethanol. A 50% solution of this resin in ethanol is stable at 20°–25° C. for more than 5 hours.

An impregnating solution suitable for treating decorative print paper is prepared as follows:

| | Parts | |
|---|---|---|
| | Total | Solids Basis |
| Benzoguanamine-formaldehyde resin (as prepared above) | 35 | 35 |
| Xylene solution of lauric acid-modified glyceryl phthalate alkyd resin (60% resin solids, and the alkyd resin being a reaction product of approximately 45% phthalic anhydride, 25% glycerol, and 30% crude lauric acid) | 25 | 15 |
| Benzene-denatured, anhydrous ethanol | 40 | 0 |
| Para-toluenesulfonic acid | 0.25 | 0.25 |

The benzoguanamine-formaldehyde resin and the xylene solution of the alkyd resin are dissolved in the ethanol solvent. The acid catalyst is added with high speed agitation until completely dissolved. Properties of this treating solution are as follows:

| | |
|---|---|
| pH | 5.0 |
| Specific gravity, g./cm.$^3$ | 1.005 |
| Viscosity, Stormer, at 25° C cps | 48 |

*Decorative print paper treatment*

A suitable print paper, e.g., Hurlbut Grade 499 or one of like basis weight and hiding power, is used. The paper is dipped in the treating syrup and passed through a laboratory infrared treater at a speed of 1.5 feet per minute. The heat output of the treater is controlled to give a treated paper having the following characteristics at the end of the run:

| | Percent |
|---|---|
| Resin content | 33.2 |
| Volatile content | 3.2 |

*Overlay paper treatment*

A suitable overlay paper, e.g., Hurlbut 900 rayon base paper, is dipped in the treating syrup and passed through a laboratory infrared treater at a speed of 1.5 feet per minute. The heat output of the treater is controlled to give the following characteristics in the treated paper:

| | Percent |
|---|---|
| Resin content | 71.4 |
| Volatile content | 2.9 |

The resin content of the impregnated paper is determined by the following formula:

$$\frac{100 \times (\text{wt. impregnated paper} - \text{wt. bone-dry untreated paper})}{\text{wt. impregnated paper}} = \text{Resin content in percent}$$

The bone-dry untreated paper weight is obtained by drying a sheet of a known area at 160° C. for 5 minutes. Normally, a 4-inch square or disc is cut with a die to obtain uniform test pieces.

The volatile content of the impregnated paper is determined as follows:

$$\frac{100 \times (\text{wt. treated sample before drying} - \text{wt. after drying})}{\text{wt. before drying}} = \text{Volatile content in percent}$$

The drying is done at 160° C. for 5 minutes. The treated sample is a 4-inch square or disc, as above.

*Surfacing structural board*

A sheet of 1/8-inch tempered hardboard is surfaced in the following manner between so-called No. 4 chrome-finished, stainless steel press plates or cauls. The plates are first thoroughly cleaned with alcohol and wiped free of dust and fingerprints. A suitable lubricant, such as a synthetic wax, is spread on the plate and then wiped with a clean, dry, lintless cloth until only a faint wax film remains. The plates are then preheated to 150° C. in a conventional laminating press. The print and overlay sheets are laid on top of the hardboard and the assembly is placed between the hot cauls. A pressure of 250 p.s.i. (pounds per square inch) is applied and maintained for 15 minutes. The pressure is then released and the laminate is removed hot.

The following properties are obtained:

| | |
|---|---|
| Appearance | Satin finish, no cracks, unwarped. |
| High temperature resistance (NEMA LP 2–1.08) | Satisfactorily passes test specification. |
| Craze resistance to heat (16 hr. exposure at 105° C.) | Do. |
| Boiling water resistance (NEMA LP 2–1.07) | Satisfactorily passes test specification. |
| Stain resistance (NEMA LP 2–1.10) | Do. |
| Water | Do. |
| 2B alcohol | Do. |
| 5% NaOH | Do. |
| 1% NaOH | Do. |
| 10% citric acid | Do. |
| 5% NH$_4$OH | Do. |
| 5% Na$_3$PO$_4$ | Do. |
| 2.5% Tide solution | Do. |
| Acetone | Do. |
| Washable ink | Do. |
| Wear resistance (NEMA LP 2–1.06) | 400–550. |
| Cold check resistance (ASTM D756–50, No. 5) | Satisfactorily passes test specification. |
| Cigarette burn resistance (NEMA LP 2–1.09) | >600 secs. |
| Light color fastness (ASTM D620–45T) | Very slight visible change. |

EXAMPLE 2

A benzoguanamine-formaldehyde resin is prepared as in Example 1 up to the vacuum-dehydration step. The pressure is reduced to 23 cm. Hg and the batch is concentrated until the temperature reaches 100° C. The batch is held under these conditions for 20 minutes. The apparatus is set for refluxing and 972 parts of benzene-denatured ethanol is added slowly, while allowing the batch to cool. The temperature is adjusted to 70° C. and 608 parts of the alkyd-resin solution described in Example 1 is added. The batch is then cooled to room temperature. The syrup properties are the same as those of the print paper-treating solution in Example 1.

*Decorative print paper treatment*

The syrup is catalyzed and used to impregnate decorative print stock in the same manner as in Example 1 with the exception that the heat output of the infrared dryer is controlled so as to give a volatile of about 1.0%. The paper is then re-dipped in the treating syrup, yielding a treated paper having the following characteristics:

| | Percent |
|---|---|
| Resin content | 55 |
| Volatile content | 4 |

*Surfacing structural board*

A sheet of 1/8" asbestos cement board is surfaced with a single sheet of the double-dipped print paper described above by means of a "cold-pull" laminating technique. The print sheet is laid on the core panel and the assembly is placed between mirror chrome-finish, stainless steel, press plates at room temperature. The entire assembly is then placed in a conventional laminating press, likewise at room temperature, and a pressure of 250–300 p.s.i. is applied and maintained throughout the operation. Pressures up to, for example, 1200 p.s.i. can be used if desired. The temperature is raised to 150° C. and held for 15 minutes. The laminate is then cooled under pressure to room temperature. The properties obtained are the same as in Example 1, with the following exceptions:

| | |
|---|---|
| Appearance | Excellent gloss, no surface cracks, unwarped. |
| Wear resistance | Less than 400. |

EXAMPLE 3

Same as in Example 1 but using 1/4" Douglas fir plywood. An unwarped article having a nice finish and no surface cracks is obtained.

EXAMPLE 4

Same as in Example 1 with the following exceptions:
(a) The treating syrup is catalyzed with 0.25 part of phthalic anhydride instead of with 0.25 part of para-toluenesulfonic acid.
(b) The print and overlay papers are pressed on 3/8" woodwaste board.

The finished article has a nice-appearing, smooth finish, shows no surface cracks and is unwarped.

EXAMPLE 5

Same as in Example 1 with the exception that no overlay sheet is used, and Douglas fir 1/4-inch plywood is surfaced on both sides with limed oak decortive print paper employing the "hot-pull" laminating technique described in Example 1. The decorative print paper is "double-dipped" under conditions regulated to give a resin content and volatile content at the end of the fist dip of 43% and 1.0%, respectively, and a resin content and volatile content at the end of the second dip of 52% and 3.5%, respectively. The resulting laminate has a smooth, nice-appearing surface finish, shows no surface cracks, and is unwarped.

EXAMPLE 6

A walnut grain print sheet is double-dipped as in Example 5. The resin content at the end of the second dip is 51%. The "cold-pull" method described in Example 2 is used in laminaating the impregnated sheet to one side only of 1/8-inch hardboard, and the laminating pressure is 250 p.s.i. The finished panel has a glossy surface which is unaffected by the following reagents: 5% NaOH, 5% $NH_4OH$, 5% $Na_3PO_4$, and a 5% solution of a commercial bead-type detergent. The bond between print sheet and hardboard is excellent, and the surface is crack-free.

EXAMPLE 7

Overlay similar to that used in Example 4 (resin content 71.4%, volatile 2.9%); print similar to that employed in Example 4, but black oak instead of limed oak (resin content 33.2%, volatile 3.2%); both sheets are pressed on one side only of 1/8-inch tempered hardboard as in Example 5. The overlay, print sheet and base are firmly bonded together, and the surface is smooth, nice-appearing and free from cracks.

EXAMPLE 8

A tan linen print sheet is "double-dipped" as in Example 5, and is pressed by the "hot-pull" method on one side only of a 3/16-inch woodwaste board. The print sheet is tightly bonded to the woodwaste board, showing no evidence of delamination, and its surface is free from cracks and has an attractive appearance.

EXAMPLE 9

Overlay and print sheets as in Example 4 are pressed by the "hot-pull" method on a 5/16-inch woodwaste board. Excellent bonding between the sheets and to the base is obtained. A crack-free, unwarped laminate is obtained.

EXAMPLE 10

A walnut grain print sheet is double-dipped as in Example 5 and pressed by the "hot-pull" method on one side only of a 1/16-inch asbestos cement board. Before pressing, the surface of the board is washed with a dilute solution of magnesium fluorosilicate to improve bonding. A glossy, unwarped laminate that shows no surface cracks is obtained.

EXAMPLE 11

Same as Example 10, but using the tan linen print described in Example 8. The resulting laminate has a glossy, crack-free surface, and is unwarped.

As shown by the foregoing examples, the technique for surfacing structural boards includes several interchangeable process variations. For instance, the treating syrups may be prepared either in two steps (Example 1) or in one step (Example 2). The structural boards may be surfaced with either a decorative print sheet alone (exemplified by Example 2) or with a combination of print and overlay sheets (exemplified by Example 1). The actual laminaating may be carried out in a "hot-pull" process (exemplified by Example 1) or a "cold-pull" process exemplified by Example 2). Furthermore, other variations may be made in the above procedures as, for instance, combining two or more similar or different structural boards in the same assembly, or laminating a resin-treated print sheet, with or without an overlay, to a non-rigid backing material such as paper or flexible film, thereby producing a thin, pliable layer which then can be applied directly to a structural board using a suitable adhesive.

EXAMPLE 12

A benzoguanamine-formaldehyde resin is prepared as follows:

| | Parts | Approx. Molar Ratio |
|---|---|---|
| Benzoguanamine | 18.7 | 1 |
| Aqueous formaldehyde (approx. 37% HCHO) | 16.2 | 2 |
| Aqueous sodium hydroxide (2 N) | 0.1 | |

The benzoguanamine and formaldehyde are charged to a suitable reaction vessel equipped with means for reflux, and 0.06 part of the sodium hydroxide is added to give a slurry pH of 7.9. The reaction mixture is heated to reflux in 15 minutes and held at reflux, 94° C., for 3 hours and 35 minutes. At this point the solution becomes turbid and hydrophobic. The remaining 0.04 part of sodium hydroxide is then added to adjust the pH of the mixture to 8.1, and the temperature is lowered to 71° C. The reaction mass is then vacuum-concentrated at 240 mm. Hg pressure until the batch temperature reaches 120° C. where it is held for 10'. The resin is dumped onto trays and cooled to obtain a clear, dry, brittle resin which is ground to between about 60-mesh and about 200-mesh fineness. The resin is infinitely dilutable in benzene-denatured, anhydrous ethanol. A 50% solution of this resin in ethanol is stable at 20°–25° C. for more than 5 hours.

(B) Parts
Benzoguanamine-formaldehyde resin of (A) ______ 300
Xylene solution of lauric acid-modified glyceryl phthalate alkyd resin (60% resin solids, and the alkyd resin being a reaction product of approximately 45% phthalic anhydride, 25% glycerol and 30% crude lauric acid) ______________________ 166
Benzene-denatured, anhydrous ethanol ___________ 95
Methyl ethyl ketone _____________________________ 10

The benzoguanamine-formaldehyde resin and the xylene solution of the alkyd resin are dissolved in the solvent mixture of ethanol and methyl ethyl ketone. The resulting solution is knife-coated, using a 16-mil gap, onto black paper print sheets which have been so impregnated with a melamine-formaldehyde resin of 1:2 molar ratio that they contain 51% resin and 2.8% volatile material. The coated sheets are dried for 10 minutes at 112° C. over a hot platen and then for 5 minutes in a 120° C. oven. The dry spread of the resin composition is observed to be 17.1 grams per square foot.

The dry, coated sheets are used as outside plies on a core of 12 plies of phenolic core stock. Laminates are made by pressing the assemblies for 40 minutes at 150° C. and under 1000 p.s.i. (pounds per square inch) pressure. The press is loaded cold and the laminate is cooled before removal from the press. The resulting products, which have a good appearance and gloss, have a Taber abrasion resistance of 22–24 milligrams loss per 1000 cycles. The products meet the NEMA specifications for decorative laminates on the alcohol resistance test, teapot test, bake test, 50-hour sunlamp test and staining test.

EXAMPLE 13

An impregnating solution, suitable for treating printed or solid color decorative paper for application by laminating technique as a surface sheet on structural boards such as Masonite, fiber board, asbestos board, plywood, wood waste board and the like is prepared as follows:

| | Parts |
|---|---|
| Benzoguanamine-formaldehyde resin prepared as in Example 1 | 35.0 |
| Lauric-acid modified alkyd resin prepared as in Example 1 | 15.0 |
| Benzene-denatured ethanol (anhydrous) | 40.0 |
| Xylene | 10.0 |
| Phthalic anhydride (curing catalyst) | 0.35 |

The phthalic anhydride is added to the resin solution in a vessel equipped with a high-speed agitator and designed to prevent evaporation of the solvent and the solution is agitated until the catalyst is completely dissolved. Typical properties of the solution are as follows:

| | |
|---|---|
| pH | 5.3 to 5.7. |
| Viscosity at 25° C. (Brookfield, No. 2 spindle, 60 r.p.m.) | 40 to 50 cps. |
| Stability at 25° C. | More than 1 week. |

The solution should be stored at 15°–25° C. in closed containers until used.

*Paper treatment.*—A suitable print paper, e.g., Hurlbut Grade 409 or one of like basis weight and hiding power, is used. A two-pass impregnating cycle is satisfactory, using the solution prepared as described above for both dips, and passing the treated paper through a laboratory infrared treater at speeds of 1.5 to 3.0 feet per minute. Heat output of the treater is controlled to give the following characteristics at the end of each pass:

| Property | First Pass | Second Pass |
|---|---|---|
| Resin content, percent | 38–42 | 51–55 |
| Volatile content (10 minutes at 150° C.), percent | 2–3 | 3–4 |
| Flow value, percent | 0–2 | 5–12 |

The characteristics of the treated paper may be controlled by variation in paper speed, heat output of drier, dip tank solids or other treater adjustments. Although satisfactory results are obtained at flow values between 2% and 15%, optimum results usually are achieved at flow values ranging between 5% and 12%.

*Surfacing structural board.*—If a highly glossed surface is desired, mirror finish chrome caul plates (free from fingerprints, streaks and dust) are used. Alcohol is a satisfactory cleanser. A suitable lubricant, such as a suitable synthetic wax, is spread on the face plate and then wiped with a clean, dry, lintless cloth until only a faint wax film remains. One sheet of the treated decorative paper is placed face down on the lubricated plate. The board to be surfaced is then placed on the paper, after which the assembly is loaded into a press and heat and pressure are applied. A backing caul plate may be used if desired. Using a pressure of 250 p.s.i. the assembly is heated to 150° C. and held at this temperature for 15–25 minutes. Before releasing the pressure at the end of the cure, the assembly is cooled to about 40° C. Cooling to this temperature aids in obtaining a glossy surface and facilitates mold release.

The following are typical properties of a Duolux Masonite board which has been surfaced as above described.

| | |
|---|---|
| Gloss | Excellent. |
| Bake resistance, 20 hrs. at 105° C. | No change. |
| Hot casserole resistance | No change or temporary change only. |
| Armstrong abrasion resistance, cc. volume loss/100 cycles | 0.249. |
| Dimensional change,[1] 48 hrs. at 104° C. shrinkage in mils/inch: | |
| Parallel to machine direction | 1.8. |
| Perpendicular to machine direction | 3.3. |
| Water absorption,[1] 15 minute boil, percent | 0.6. |
| Stain resistance, 16 hrs., NEMA standards: | |
| Benzene-denatured ethanol | Passes test. |
| 1% NaOH | do. |
| 2.5% soap | do. |
| 5% $Na_3PO_4$ | do. |
| 5.7% $NH_3$ | do. |

[1] The dimensional stability and water-absorption tests were made on solid assembly paper laminates prepared from the treated sheet.

If it be desired to apply a resin-impregnated overlay sheet over the resin-impregnated print sheet, this is done by placing the overlay sheet face down on the lubricated plate and then laying the treated decorative paper next to it. The overlay sheet previously has been impregnated (followed by drying) with a suitable resin, e.g., an alkyd resin-modified benzo-guanamine-formaldehyde resin of the same kind used in impregnating the print sheet, a polyvinyl butyral-modified benzoguanamine-formaldehyde resin, an alkyd resin-modified N,N-diallylmelamine-formaldehyde resin, polymeric diallyl phthalate, etc.

The flow value to which reference has been made in the foregoing example is determined as follows:

The dry, resin-impregnated paper to be tested is cut up into discs 3″ in diameter. Six of these discs, or 8 of them if the paper is to be used in an overlay application, are stapled together in the center. The resulting assembly is weighed, placed between 2 sheets of cellophane and put into a 300° F. press. Within 10 seconds after insertion the pressure is raised to 1100 p.s.i., held there for 3 minutes and then released. The flash is removed by scraping the edge. The pressed piece is again weighed and the percent flow calculated as follows:

$$\frac{\text{Initial wt.} - \text{final wt.}}{\text{Initial wt.}} \times 100 = \text{Percent flow}$$

EXAMPLE 14

A toluguanamine-formaldehyde resin is prepared as follows:

| | Parts | Approx. Molar Ratio |
|---|---|---|
| Toluguanamine | 1,005 | 1 |
| Aqueous formaldehyde (approx. 37% HCHO) | 810 | 2 |
| Aqueous sodium hydroxide (2 N) | 3 | |

The toluguanamine and aqueous formaldehyde are charged to a reaction vessel equipped with means for reflux, and 2 parts of the aqueous sodium hydroxide is added to give a slurry pH of 6.5. The reaction mixture is heated to reflux in 35 minutes and held at reflux, 95° C., for 80 minutes. At this time the solution becomes turbid and hydrophobic. The remaining 1 part of sodium hydroxide is added to adjust the pH of the mixture to 8.5 and, starting at 59° C., the solution is vacuum-concentrated at a pressure of 240 mm. of mercury until the temperature reaches 120° C. The resin is dumped into trays, cooled and ground. A 50% solution of this resin in ethanol is stable at 20°–25° C. for more than 5 hours.

This resin is blended with a xylene solution of lauric acid-modified glyceryl phthalate alkyd resin in the same manner described under Example 2 with reference to the production of a similarly modified benzoguanamine-formaldehyde resin, and is used in treating decorative paper (print sheet) in essentially the same manner described in that example. The treated paper is used in surfacing structural board likewise in the same manner described under Example 13. Similar results are obtained.

It will be understood, of course, by those skilled in the art that our invention is not limited to the use of a mixture of the specific resins given in the above illustrative examples nor to the specific procedures there given in producing the articles. Thus, instead of a benzoguanamine-formaldehyde or toluguanamine-formaldehyde resin, we can use any other curable condensation product of an aldehyde and a 2-aryl-4,6-diamino-1,3,5-triazine that has been reacted under the conditions and to the end point hereindescribed. Numerous examples of aldehydes and of 2-aryl-4,6-diamino-1,3,5-triazines have been given hereinbefore. The preferred aldehydic reactant is formaldehyde or a compound engendering formaldehyde and the preferred 2-aryl-4,6-diamino-1,3,5-triazine is benzoguanamine.

Likewise, instead of the lauric acid-modified glyceryl phthalate type of alkyd resin that was employed in the foregoing examples, one can use any other alkyd resin that is compatible with the 2-aryl-4,6-diamino-1,3,5-triazine-aldehyde resin, employing the proportions hereinbefore given. Numerous examples of such alkyd resins also have been given hereinbefore. More specific examples include alkyd resins produced by reaction of 3.3 moles propylene glycol with 2 moles fumaric or maleic acid and 1 mole phthalic anhydride; and one produced by reaction of, by weight, 26% glycerol, 41% phthalic anhydride and 33% soya bean oil fatty acids.

In the foregoing examples describing the preparation of the aryl diaminotriazine-aldehyde resin, the reaction between these reactants (instead of being continued to the particular end point recited in the individual example) can be continued until a small amount of a finely ground sample of the resin in solid state produces a definite blue haze at 25° C. in about 10–15 ml. of a 50–50 mixture, by weight, of ethanol and water.

The following examples are illustrative of the prior-art practices and of the results that are obtained.

EXAMPLE 15

A so-called standard decorative laminate is prepared as follows:

Using commercial equipment and methods, a conventional overlay type paper (i.e., Hurlbut 900 rayon base) is treated with a melamine-formaldehyde laminating resin to a resin content of 67% and a volatile content of 4%.

A decorative print paper (i.e., Hurlbut 822CG, tan pickled limed oak) is treated with the same melamine resin as above to a resin content of 50% and a volatile content of 4%.

A single sheet each of print and overlay paper are laid on a core assembly consisting of 7 sheets of kraft paper impregnated with phenolic resin to a resin content of about 35%. The entire assembly is placed between mirror surface chrome-finish stainless steel press plates, and loaded into a conventional laminating press at room temperature. A pressure of 1100 p.s.i. is applied and maintained throughout the operation. The temperature of the press platens is raised to 150° C. and held for 15 minutes. The laminate is then cooled under pressure to room temperature. Heating and cooling the laminate under pressure constitute the so-called "cold-pull" technique. Considerable warping occurs on removal of the laminate from the press and this tendency is counteracted in commercial practice by gluing the laminate to a stiff backing material such as hardboard or plywood, using conventional adhesive techniques.

EXAMPLE 16

The print and overlay paper described in Example 15 are used to surface both sides of Douglas fir ¼-inch 3-ply cross-banded plywood by means of a "hot-pull" technique. With this method, the press plates are preheated to 150° C. in the press and the laminate assembly is then placed between the hot plates. A pressure of 250 p.s.i. is applied and maintained for 15 minutes. The pressure is then released and the laminate is removed hot. Following removal from the press, the surface of the panel cracks severely and the panel warps badly.

EXAMPLE 17

Same as in Example 16 but with no overlay sheet. The print sheet is solid white Hurlbut 499 paper. The resulting laminate is badly warped and the surface is severely cracked.

EXAMPLE 18

A melamine resin-treated print sheet as described in Example 15 is placed on one surface of a ⅛-inch tempered hardboard, S2S type, i.e., smooth on both sides. A melamine resin-treated overlay sheet as described in Example 15 is placed on the opposite surface in order to balance the panel and reduce warping. The hot-pull method of Example 16 is used. On removal from the press, the print sheet delaminates completely from the hardboard core because of insufficient flow of the resin at the low (250 p.s.i.) pressure used.

Figure 1:
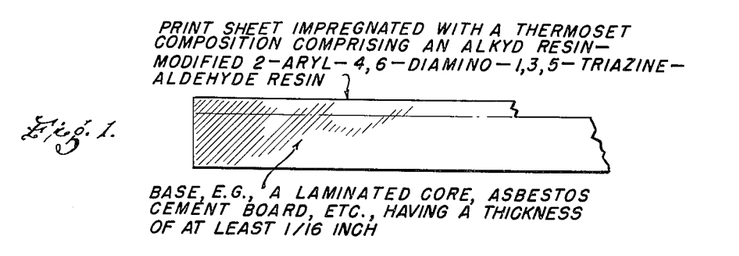
Figure 2:
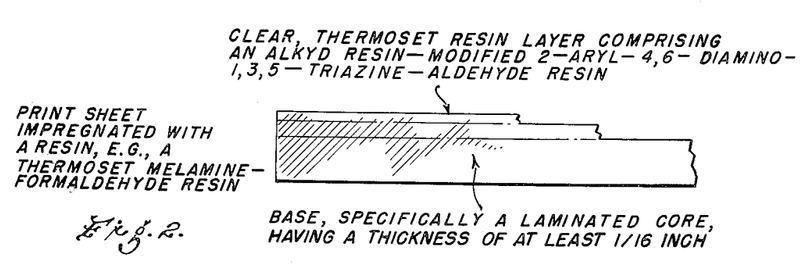
Figure 3:
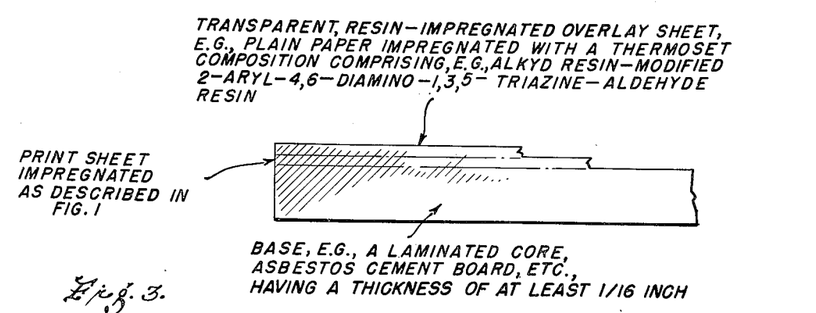

With reference to the accompanying drawing and especially to FIG. 2 thereof, it may be mentioned that the surface layer there shown and which is constituted of clear, thermoset resin comprising an alkyd resin-modified 2-aryl-4,6-diamino-1,3,5-triazine-aldehyde resin may be varied in thickness as desired or as conditions may require, but is usually of the order of from 0.1 to 10 or 12 mils in thickness. It is also pointed out that the drawings are illustrative only and that the thicknesses of the layers over the base have been exaggerated for purpose of clarity.

This application is a continuation-in-part of our co-pending application Serial No. 312,218, filed September 30, 1952, which latter application is a continuation-in-part of our application Serial No. 285,068, filed April 29, 1952, now Patent No. 2,761,779, dated September 4, 1956, and said application Serial No. 312,218 being now abandoned. Application Serial No. 285,068 was filed as a continuation-in-part of application Serial No. 102,948, filed July 2, 1949, these applications being copending until the latter application was abandoned.

We claim:

1. An article of manufacture comprising a decorative structure including (1) a base member having a thickness of at least 1/16 inch, said thickness being correlated with the density of said base member whereby said base member is adapted to retain its normal form under moderate stress; (2) a thermoset resin-impregnated print sheet bonded directly to said base member, and (3) a clear thermoset resin layer, integral with said print sheet, comprising a thermoset alkyd resin-modified diaminotriazine-formaldehyde resin, said clear thermoset resin layer being, in an uncured state, a curable resinous composition comprising a compatible blend of (A) a thermosetting resinous reaction product consisting essentially of formaldehyde and a diaminotriazine represented by the general formula:

where R represents an aryl radical, wherein the mol ratio of formaldehyde to said diaminotriazine is from about 1:1 to about 4:1, respectively, said thermosetting resinous reaction product having been formed by reacting formaldehyde and said diaminotriazine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

2. An article of manufacture comprising a decorative structure including (1) a base member having a thickness of at least ⅟₁₆ inch, said thickness being correlated with the density of said base member whereby said base member is adapted to retain its normal form under moderate stress; (2) a thermoset melamine-formaldehyde resin-impregnated print sheet bonded directly to said base member, and (3) a clear thermoset resin layer, integral with said print sheet, comprising a thermoset alkyd resin-modified diaminotriazine-formaldehyde resin, said clear thermoset resin layer being, in an uncured state, a curable resinous composition comprising a compatible blend of (A) a thermosetting resinous reaction product consisting essentially of formaldehyde and a diaminotriazine represented by the general formula:

where R represents an aryl radical, wherein the mol ratio of formaldehyde to said diaminotriazine is from about 1:1 to about 4:1, respectively, said thermosetting resinous reaction product having been formed by reacting formaldehyde and said diaminotriazine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

3. An article of manufacture comprising a decorative structure including (1) a base member comprising a plurality of thermoset phenolic resin-impregnated fibrous sheets and having a thickness of at least ⅟₁₆ inch, said thickness being correlated with the density of said base member whereby said base member is adapted to retain its normal form under moderate stress; (2) a thermoset melamine-formaldehyde resin-impregnated print sheet bonded directly to said base member, and (3) a clear thermoset resin layer, integral with said print sheet, comprising a thermoset alkyd resin-modified benzoguanamine-formaldehyde resin, said clear thermoset resin layer being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

4. An article of manufacture comprising a decorative structure including (1) a base member comprising plywood having a thickness of at least ⅟₁₆ inch, said thickness being correlated with the density of said base member whereby said base member is adapted to retain its normal form under moderate stress; (2) a thermoset melamine-formaldehyde resin-impregnated print sheet bonded directly to said base member, and (3) a clear thermoset resin layer, integral with said print sheet, comprising a thermoset alkyd resin-modified benzoguanamine-formaldehyde resin, and clear thermoset resin layer being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

5. An article of manufacture comprising a decorative structure including (1) a base member comprising wood-waste board having a thickness of at least ⅟₁₆ inch, said thickness being correlated with the density of said base member whereby said base member is adapted to retain its normal form under moderate stress; (2) a thermoset melamine-formaldehyde resin-impregnated print sheet bonded directly to said base member, and (3) a clear thermoset resin layer, integral with said print sheet, comprising a thermoset alkyd resin-modified benzoguanamine-formaldehyde resin, said clear thermoset resin layer being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

6. An article of manufacture comprising a decorative structure including (1) a base member comprising asbestos cement board having a thickness of at least ⅟₁₆ inch, said thickness being correlated with the density of said base member whereby said base member is adapted to retain its normal form under moderate stress; (2) a thermoset melamine-formaldehyde resin-impregnated print sheet bonded directly to said base member, and (3) a clear thermoset resin layer, integral with said print sheet, comprising a thermoset alkyd resin-modified benzoguanamine-formaldehyde resin, said clear thermoset resin layer being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

7. An article of manufacture comprising a decorative structure including (1) a base member having a thickness of at least 1/16 inch, said thickness being correlated with the density of said base member whereby said base member is adapted to retain its normal form under moderate stress, and (2) a thermoset alkyd resin-modified diaminotriazine-formaldehyde resin-impregnated print sheet bonded directly to said base member, the thermoset resin with which said print sheet is impregnated being, in an uncured state, a curable resinous composition comprising a compatible blend of (A) a thermosetting resinous reaction product consisting essentially of formaldehyde and a diaminotriazine represented by the general formula:

where R represents an aryl radical, wherein the mol ratio of formaldehyde to said diaminotriazine is from about 1:1 to about 4:1, respectively, said thermosetting resinous reaction product having been formed by reacting formaldehyde and said diaminotriazine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight based on the total weight of (A) and (B), of an alkyd resin which is compatible with (A).

8. An article of manufacture comprising a decorative structure including (1) a base member comprising a plurality of thermoset phenolic resin-impregnated fibrous sheets and having a thickness of at least 1/16 inch, said thickness being correlated with the density of said base member whereby said base member is adapted to retain its normal form under moderate stress, and (2) a thermoset alkyd resin-modified benzoguanamine-formaldehyde resin-impregnated print sheet bonded directly to said base member, the thermoset resin with which said print sheet is impregnated being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

9. An article of manufacture comprising a decorative structure including (1) a base member comprising plywood having a thickness of at least 1/16 inch, said thickness being correlated with the density of said base member whereby said base member is adapted to retain its normal form under moderate stress, and (2) a thermoset alkyd resin-modified benzoguanamine-formaldehyde resin-impregnated print sheet bonded directly to said base member, the thermoset resin with which said print sheet is impregnated being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

10. An article of manufacture comprising a decorative structure including (1) a base member comprising woodwaste board having a thickness of at least 1/16 inch, said thickness being correlated with the density of said base member whereby said base member is adapted to retain its normal form under moderate stress, and (2) a thermoset alkyd resin-modified benzoguanamine-formaldehyde resin-impregnated print sheet bonded directly to said base member, the thermoset resin with which said print sheet is impregnated being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

11. An article of manufacture comprising a decorative structure including (1) a base member comprising asbestos cement board having a thickness of at least 1/16 inch, said thickness being correlated with the density of said base member whereby said base member is adapted to retain its normal form under moderate stress, and (2) a thermoset alkyd resin-modified benzoguanamine-formaldehyde resin-impregnated print sheet bonded directly to said base member, the thermoset resin with which said print sheet is impregnated being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C. until a 50 ml. solution of the resulting reaction product in ethyl alcohol was stable at 20–25° C. for at least 5 hours, with the reaction not being allowed to proceed beyond the point at which said reaction product had a plasticity of about 60 mils as determined by the Cyanamid test method, and (B) from about 10% to about 50% by weight, based on the total weight of (A) and (B), of an alkyd resin which is compatible with (A).

12. An article of manufacture comprising a decorative structure including (1) a base member having a thickness of at least 1/16 inch, said thickness being correlated with the density of said base member whereby said base member is adapted to retain its normal form under moderate stress; (2) a thermoset alkyd resin-modified diaminotriazine-formaldehyde resin-impregnated print sheet bonded directly to said base member, and (3) a transparent, thermoset resin-impregnated overlay sheet united directly to said print sheet, the thermoset resin with which said print sheet is impregnated being, in an uncured state, a curable resinous composition comprising a compatible blend of (A) a thermosetting resinous reaction product consisting essentially of formaldehyde and a diaminotriazine represented by the general formula:

where R represents an aryl radical, wherein the mol ratio of formaldehyde to said diaminotriazine is from about 1:1 to about 4:1, respectively, said thermosetting resinous reaction product having been formed by reacting formaldehyde and said diaminotriazine at a temperature of from about 60° C. to about 200° C., at a pH of from about 4 to about 9, until a small amount of a finely ground sample of said reaction product in solid state produced a definite blue haze at 25° C. in about 10–15 ml. of a 50–50 mixture, by weight, of ethanol and water, and (B) from about 10% to about 50% by weight, based on the total weight of (A) and (Z), of an alkyd resin which is compatible with (A).

13. An article of manufacture comprising a decorative structure including (1) a base member having a thickness of at least 1/16 inch, said thickness being correlated with the density of said base member whereby said base member is adapted to retain its normal form under moderate stress; (2) a thermoset alkyd resin-modified benzoguanamine-formaldehyde resin-impregnated print sheet bonded directly to said base member, and (3) a transparent, thermoset alkyd resin-modified benzoguanamine-formaldehyde resin-impregnated overlay sheet united directly to said print sheet, the thermoset resin with which said print sheet and said overlay sheet are impregnated being, in an uncured state, a curable resinous composition comprising a compatible blend of (A) a thermosetting resinous reaction product consisting essentially of formaldehyde and benzoguanamine wherein the mol ratio of formaldehyde to benzoguanamine is from about 1.5:1 to about 2.5:1, respectively, said thermosetting resinous reaction product having been formed by reacting formaldehyde and benzoguanamine at a temperature of from about 60° C. to about 200° C., at a pH of from 4 to about 9, until a small amount of a finely ground sample of said reaction product in solid state produced a definite blue haze at 25° C. in about 10–15 ml. of a 50–50 mixture, by weight, of ethanol and water, and (B) from about 10% to about 50% by weight, based on the total weight of (A) and (B), of an alkyd resin which is compatible with (A).

References Cited in the file of this patent
UNITED STATES PATENTS

| | | |
|---|---|---|
| 2,218,474 | Moore | Oct. 15, 1940 |
| 2,439,929 | Hill et al. | Apr. 20, 1948 |
| 2,486,235 | Watt | Oct. 25, 1949 |
| 2,579,980 | Spencer | Dec. 25, 1951 |
| 2,694,028 | Rapp | Nov. 9, 1954 |
| 2,801,198 | Morris et al. | July 30, 1957 |

OTHER REFERENCES

Noble: "Laminating With Melamine Resins," by T. W. Noble, in Plastics, December 1946, pages 46, 48, 49, 94 and 95 relied upon.